UNITED STATES PATENT OFFICE.

ARTHUR J. BALDWIN, OF EAST ORANGE, NEW JERSEY, ASSIGNOR TO BALDWIN-LESTER CORPORATION, A CORPORATION OF NEW YORK.

PROCESS OF PRESERVING EDIBLE SUBSTANCES.

940,848.

Specification of Letters Patent.

Patented Nov. 23, 1909.

No Drawing.

Application filed March 15, 1909. Serial No. 483,629.

*To all whom it may concern:*

Be it known that I, ARTHUR J. BALDWIN, a citizen of the United States, residing at East Orange, county of Essex, and State of New Jersey, have invented certain new and useful Improvements in Processes of Preserving Edible Substances, of which the following is a full, clear, and exact description.

The prior art, in so far as it pertains to the present case, may be assumed to be as follows: It has been demonstrated that substances containing bacteria may be sterilized by subjecting them to a sustained pressure exerted upon their molecules, for example, such a pressure as would be effected by a gas under compression, and further, that such substances may be preserved in a substantially sterile condition by the maintenance of such pressure. This discovery forms the subject of a joint application of James F. Lester and myself, filed February 16, 1909, Ser. No. 478,321, now Patent No. 920,811, issued May 4, 1909. In the practical application of this discovery, the gas which is usually employed because of its superior germicidal and preservative properties as well as its cheapness and availability, is carbon dioxid, but some substances, particularly milk, which is peculiarly sensitive in this respect, acquire a foreign flavor from the absorption or presence of this gas, which impairs their value for many uses. I have found, however, that the objections to the use of this and similar gases which impart a foreign flavor to the substances upon which they may have been employed to produce and maintain this pressure, is entirely removed and the substances restored to their original palatable condition, by subjecting them, after the withdrawal of such pressure, to a partial vacuum. My invention consists, then, in two steps, viz., destroying and inhibiting the growth or development of bacteria in edible substances by subjecting such substances to the sustained pressure of a gas and then eliminating the gas which has been absorbed by or is present in said substances, and more specifically in destroying and inhibiting the growth or development of bacteria in edible substances by subjecting such substances to the sustained pressure of a gas, and, after the withdrawal or removal of such pressure, subjecting them to the action of a partial vacuum.

In carrying out my invention I take, say, a quantity of milk and subject it in a suitable chamber to a pressure of carbon dioxid gas of from 70 to 200 pounds to the square inch. Such pressure, acting for a comparatively brief period, will be found to practically destroy all living organisms in the milk, and to inhibit the growth or development of germs therein as long as it is maintained. The milk, however, acquires very rapidly a somewhat disagreeable flavor and is rendered more or less unpalatable by the absorption or presence in it of the gas, but this I remove entirely either by allowing the receptacle containing the milk to remain in the same chamber and exhausting the gas therefrom, or placing it in another chamber connected with an exhaust pump capable of producing a partial vacuum therein. In a very short time, according as the vacuum is more or less complete, the milk is restored to its original palatable condition. In this way milk and other substances which, upon an exposure to air, rapidly deteriorate or spoil, may be sterilized and preserved for long periods without impairment of their original flavor and nutritious properties.

It will be understood, of course, that the primary object and chief value of the invention are the rendering commercially available the highly germicidal and preservative properties which such innocuous and readily obtainable gases as carbon dioxid have been found to possess when acting under pressure upon edible and potable substances which acquire, under such treatment an objectionable flavor.

What I claim is:

1. The improvement in preserving edible substances which consists in maintaining such substances under the pressure of a gas to destroy the living and inhibit the development of bacteria therein, and then eliminating the gas present in the substances to remove the foreign flavor acquired by the absorption or presence of said gas therein.

2. The improvement in preserving edible substances which consists in maintaining such substances under the pressure of carbon dioxid gas to destroy the living and inhibit the development of bacteria therein, and then eliminating the gas present in the substances to remove the foreign flavor acquired by the absorption or presence of said gas therein.

3. The improvement in preserving edible substances which consists in maintaining such substances under the pressure of a gas to destroy the living and inhibit the development of bacteria therein, and then subjecting the substances to a vacuum for removing the foreign flavor acquired by the absorption or presence of the gas, as set forth.

4. The improvement in the art of sterilizing and preserving milk, which consists in maintaining the milk under the pressure of carbon dioxid gas to destroy the living and inhibit the development of bacteria therein, and then subjecting the milk to a vacuum for removing the foreign flavor acquired by the absorption or presence of the gas, as set forth.

In testimony whereof I affix my signature in the presence of two subscribing witnesses.

ARTHUR J. BALDWIN.

Witnesses:
FREDERIC MONTGOMERY,
JAS. F. LESTER.